United States Patent [19]

Luebke et al.

[11] 4,362,148

[45] Dec. 7, 1982

[54] COOKING DEVICE WITH COVER LOCKING MEANS

[75] Inventors: Clement J. Luebke, Beloit, Wis.; Lowell W. Daniels, Rockford, Ill.

[73] Assignee: Alco Standard Corporation, Valley Forge, Pa.

[21] Appl. No.: 164,244

[22] Filed: Jun. 30, 1980

[51] Int. Cl.³ .................... F24D 1/00; B65D 43/20
[52] U.S. Cl. .................... 126/369; 126/377; 219/440; 220/316; 220/347
[58] Field of Search ............... 219/431, 440; 126/369, 126/376, 377, 378; 220/316, 243, 247, 329, 347; 99/403, 407

[56] References Cited

U.S. PATENT DOCUMENTS 2,914,063 11/1959 Wagner ..................... 126/369 X
2,917,200 12/1959 Phelan et al. ................ 220/316
4,273,991 6/1981 Barnhill ..................... 126/369 X Primary Examiner—Samuel Scott
Assistant Examiner—Randall L. Green
Attorney, Agent, or Firm—Leydig, Voit, Osann, Mayer & Holt, Ltd.

[57] ABSTRACT

A pressure fryer having a vessel adapted to cook a food product within a bath of cooking oil. A cover seals the vessel in a pressure-tight condition and, as pressure builds up in the vessel, the cover automatically locks an opening-closing actuator to prevent the cover from being opened. When the pressure is relieved, the cover unlocks the actuator to permit opening of the cover.

4 Claims, 7 Drawing Figures

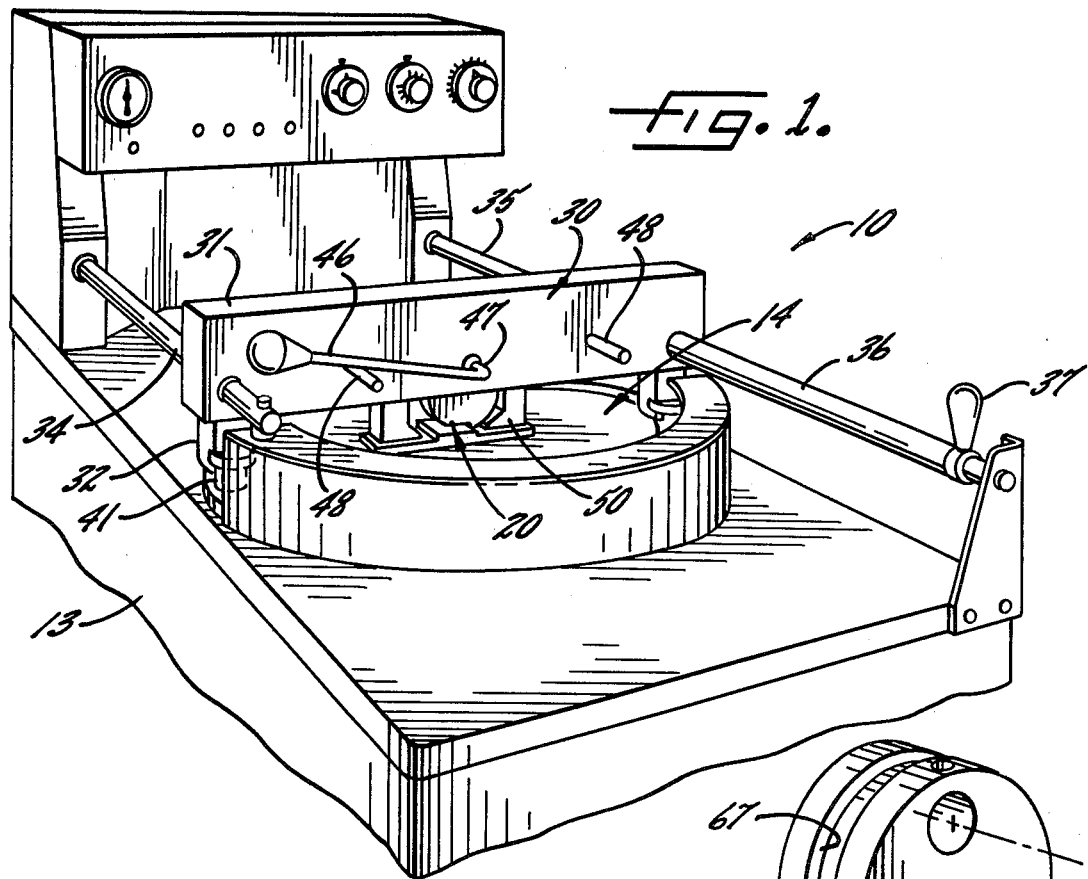
Fig. 1.
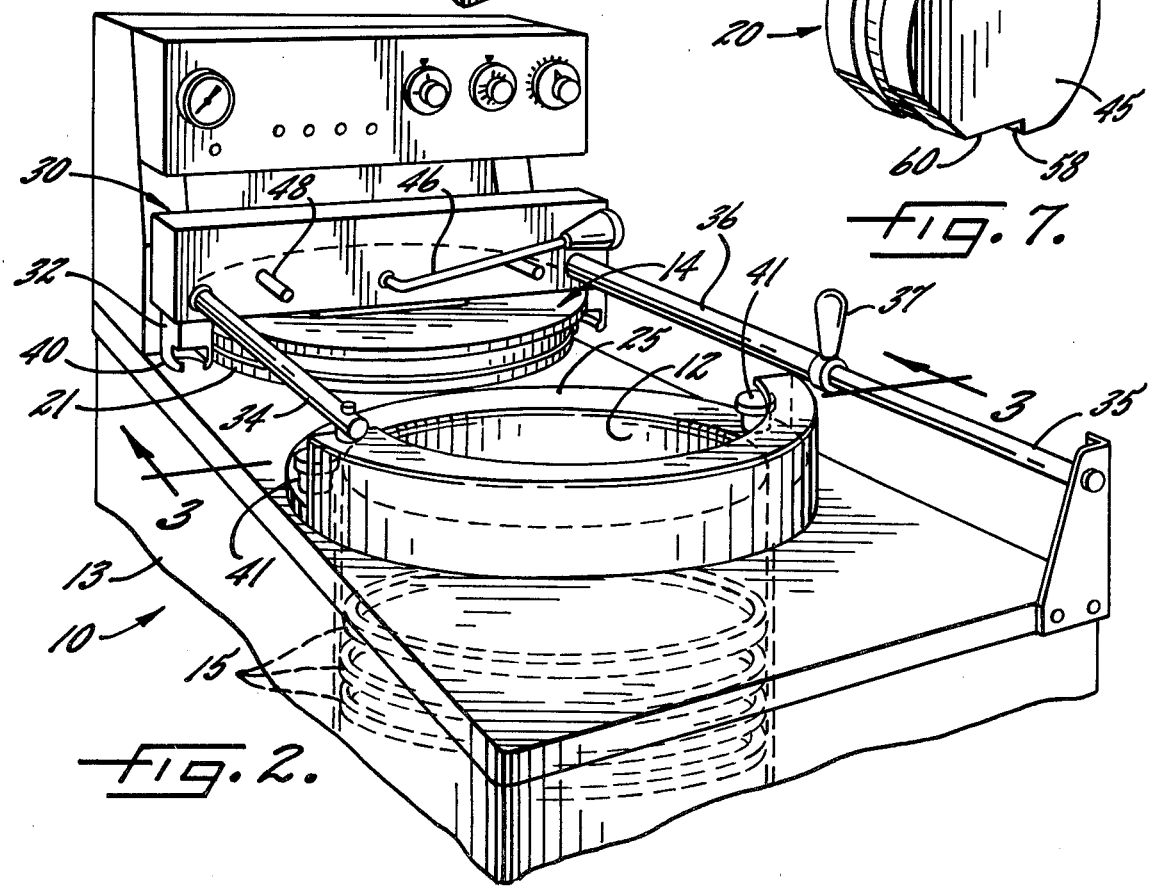
Fig. 2.
Fig. 7.

COOKING DEVICE WITH COVER LOCKING MEANS

BACKGROUND OF THE INVENTION

This invention relates generally to a cooking device and more particularly to a pressure fryer of the type having a pressure-tight cooking vessel which is adapted to hold a bath of cooking oil and a food product such as chicken. The vessel of such a fryer may be heated either electrically or by a gas burner and is equipped with a removable cover which is adapted to be sealed to the vessel to establish a pressure-tight condition therein.

The fryer is operated by placing a quantity of cooking oil in the vessel, by activating the heater to raise the temperature of the oil, by placing the food product in the vessel and by then sealing the vessel with the cover. Pressure is generated in the vessel as the moisture in the product reaches the boiling point and vaporizes into steam. The pressure which is generated reduces the cooking time and also raises the boiling point of the juices in the product so that flavor is sealed in and less shrinkage occurs.

To prevent the operator of the fryer from being burned by hot oil, it is essential that the cover of the vessel be locked in its closed and sealed position as long as there is any substantial pressure in the vessel. If the cover should happen to be unsealed and opened while the vessel is pressurized, hot oil would explode from the vessel and could seriously burn the person who is operating the fryer.

Various arrangements have been devised in order to keep the cover locked in a closed position while the vessel is pressurized. One such arrangement involves the use of a pressure-responsive plunger which is slidably mounted in the cover. As pressure builds up in the vessel, it forces the plunger to a locking position in which the plunger engages the opening-closing actuator of the cover and prevents the actuator from being operated in a direction to open the cover. When the pressure is relieved, the plunger releases the opening-closing actuator of the cover to permit opening of the cover.

Since the locking plunger is exposed to the pressure in the vessel, it requires frequent cleaning and servicing to prevent cooking oil and food product from interfering with the sliding motion of the plunger. Also, the plunger sometimes may act erratically and permit the cover to be opened before the pressure in the vessel has been reduced to a definitely safe value.

SUMMARY OF THE INVENTION

The general aim of the present invention is to provide a pressure cooking device having a new and improved pressure-responsive cover which self-locks the opening-closing actuator of the cover in a closed position as long as the cooking vessel is pressurized, the cover thereby enabling the construction of the cooking device to be simplified and eliminating the need for providing, cleaning and servicing a separate locking device.

A more detailed object is to achieve the foregoing by providing a pressure cooking device in which the cover itself acts as a locking piston and automatically latches the opeing-closing actuator in its closed position when pressure builds up in the vessel.

The invention also resides in the novel construction of the cover and in the unique provision of a plunger for facilitating release of the cover from latching engagement with the opening-closing actuator.

These and other objects and advantages of the invention will become more apparent from the following detailed description when taken in conjunction with the accompany drawings.

BRIEF DESCRIPTION OF THE DRAWINGS

FIG. 1 is a fragmentary perspective view of a new and improved pressure fryer incorporating the unique features of the present invention, the cover of the fryer being shown in a closed and sealed position.

FIG. 2 is a view similar to FIG. 1 but shows the cover in a fully open position.

FIG. 7 is a perspective view of part of the opening-closing actuator of the cover.

DETAILED DESCRIPTION OF THE PREFERRED EMBODIMENT

Figure 3:
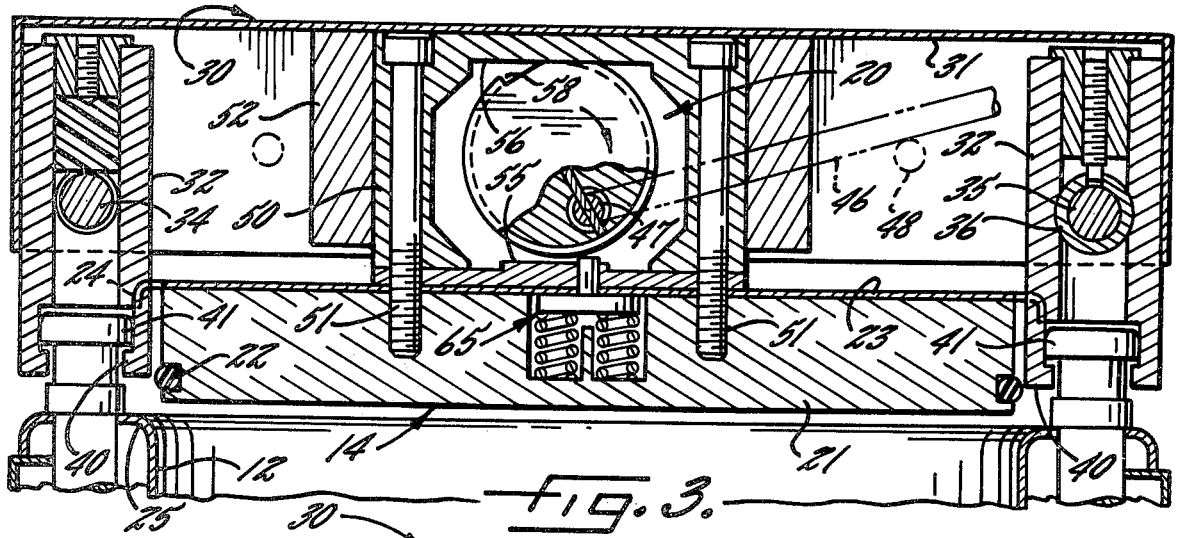
FIG. 3 is an enlarged fragmentary cross-section taken substantially along the line 3—3 of FIG. 2 and shows the cover in a closed but unsealed position.

As shown in the drawings for purposes of illustration, the invention is embodied in a cooking device which preferably is in the form of a pressure fryer 10 adapted to be used for cooking chicken, fish, potatoes and other food products under pressure and in a bath of hot cooking oil. In general, the fryer 10 comprises an open top stainless steel vessel 12 (FIG. 2) supported by a base or cabinet 13 and defining a cooking well. The vessel is adapted to be sealed in a pressure-tight condition by a removable cover 14. Disposed within the lower portion of the vessel is an array of ring-like electrical resistance heating elements 15 adapted to be energized from an a.c. voltage source. Alternatively, the vessel may be heated by a gas-fired burner located outside of the vessel.

To use the fryer 10, the vessel 12 is filled with a suitable cooking oil and then the heating elements 15 are energized to raise the oil to a predetermined temperature. Alternatively, solid shortening may be placed in the vessel and may be melted and heated to the required temperature by the heating elements.

After the oil has been heated, the chicken or other food product is placed in a wire mesh basket (not shown) which then is inserted into the vessel 12 and immerased in the oil. Thereafter, the cover 14 is placed on the top of the vessel and is sealed. During the cooking process, the moisture in the food product vaporizes and creates pressure in the vessel. Such pressure shortens the cooking time and also enhance the quality of the cooked product. A pressure relief valve (not shown) prevents the pressure within the vessel from exceeding about 12 p.s.i.

When the production has cooked for a predetermined period of time, the heating elements 15 are de-energized and the pressure within the vessel 12 is released by opening a valve (not shown). After the pressure drops, the cover 14 is opened to enable removal of the product.

If the cover 14 is opened while there is pressure of any substantial magnitude in the vessel 12, there is a danger that hot oil could boil up from the vessel and burn the operator of the fryer 10. To guard against this danger, the cover is adapted to be locked in its sealed position on top of the vessel and cannot be opened until such time as the pressure in the vessel has been reduced to a safe value.

In accordance with the present invention, the cover 14 itself is responsive to the pressure in the vessel 12 and is adapted to automatically lock and unlock an actuator 20 for opening and closing the cover. As a result, there is no need for an external safety lock for preventing release of the cover when the vessel is under pressure and thus the construction of the fryer 10 is simplified and the need for cleaning and servicing of an external safety lock is eliminated.

More specifically, the cover 14 herein comprises a rather massive cylindrical body 21 (FIG. 3) which is adapted to telescope downwardly into the vessel 12. An O-ring 22 encircles the body 21 adjacent the lower end thereof and serves to establish a pressure-tight seal between the body and the inside of the vessel. A stainless steel plate 23 (FIG. 3) is secured to the top of the body and is formed with a downwardly projecting peripheral skirt 24. When the cover is fully closed and sealed, the skirt either engages or is disposed in close proximity to an outwardly projecting flange 25 which is formed around the top of the vessel 12.

The cover 14 is mounted on a transversely extending support or yoke 30 which is formed by a box-like sheet metal housing 31 (FIG. 3) and by a pair of sleeves 32 depending from opposite ends of the housing. The yoke is adapted to be moved forwardly and rearwardly of the cabinet 13 along a pair of horizontal guide rods 34 and 35 which extend through the housing 31 and the sleeves 32. A forwardly extending tube 36 (FIG. 1) is fastened to one end of the housing 31 and is telescoped slidably over the guide rod 35. By pulling or pushing on a handle 37 on the forward end of the tube, the yoke 30 and the cover 14 may be shifted forwardly and rearwardly along the guide rods.

When the yoke 30 is in its rearward position shown in FIG. 2, the cover 14 is spaced rearwardly of the vessel 12 and is disposed in an open position allowing full access to the vessel for the purpose of placing product in or removing product from the vessel. When the yoke is pulled forwardly, the cover 14 overlies the vessel 12 but is located in a non-sealing position (FIG. 3) with the body 21 spaced upwardly from the vessel. Inwardly projecting lips 40 (FIG. 3) on the lower ends of the sleeves 32 interfit with latching posts 41 when the cover is in its forward position. The latching posts project upwardly from the flange 25 of the vessel 12.

The cover 14 is adapted to be moved vertically between its non-sealing position (FIG. 3) and a sealing position (FIG. 4), the body 21 being telescoped downwardly into and sealing against the vessel 12 when the cover is in its sealing position. The cover is shifted between its non-sealing and sealing positions by manually turning the actuator 20. In the present instance, the actuator includes a cam 45 (FIGS. 3 to 7) in the form of a substantially circular disc. A crank or handle 46 is formed with a right-angle shaft portion 47 which is secured to the disc at a position radially offset from the central axis thereof. The shaft portion 47 of the handle 46 is rotatably supported by the housing 31 of the yoke 30 and thus the cam 45 is supported for eccentric rotation within the housing. The handle 46 is adapted to be swung from a cover-open position shown in FIGS. 2 and 3 to a cover-closed position shown in FIGS. 1 and 4 and, in each position, the handle engages a stop pin 48 which projects forwardly from the housing.

As shown in FIG. 3, the cam 45 is positioned within a lifter box 50 which forms part of the cover 14 and which is secured rigidly to the body 21 by screws 51. The lifter box is guided for up and down sliding relative to the yoke 30 by a pair of transversely spaced rails 52 located within the housing 31.

Figure 4:
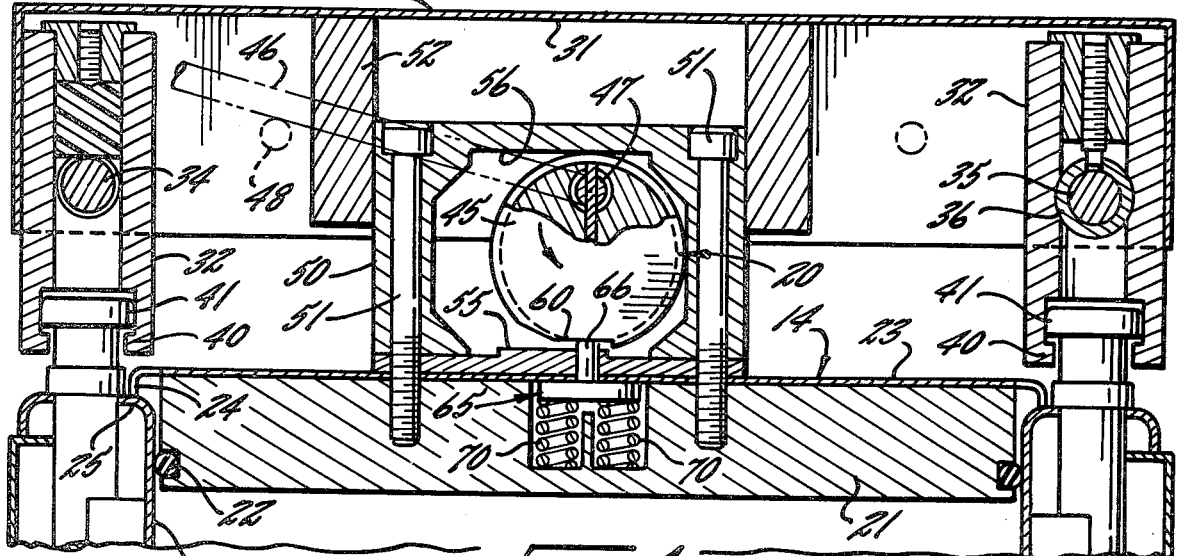
FIG. 4 is a view similar to FIG. 3 but shows the cover in a fully closed and sealed position.
Figures 5, 6:
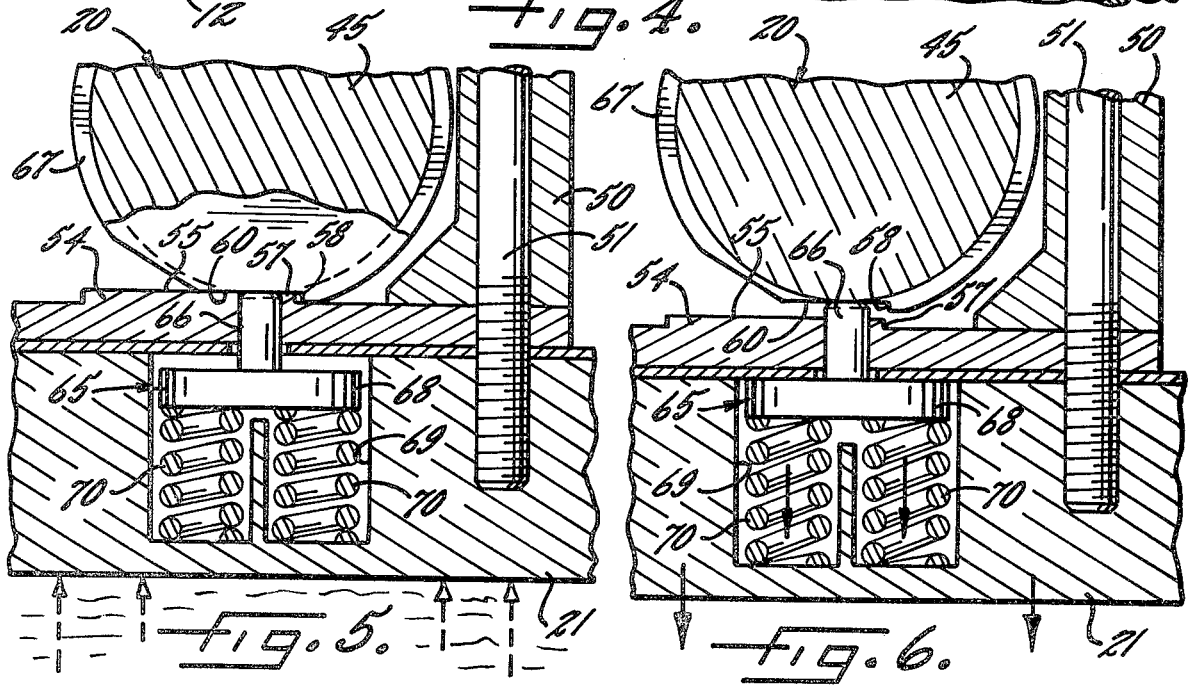
FIG. 5 is an enlarged view of certain parts illustrated in FIG. 4 and shows the position of the cover after pressure has built up in the vessel.
FIG. 6 is a view similar to FIG. 5 but shows the position of the cover after the pressure in the vessel has been relieved.

When the cover 14 is in its non-sealing position shown in FIG. 3 and the actuator handle 46 is turned counterclockwise, the peripheral surface of the cam 45 engages and bears against an upwardly facing surface 55 at the bottom of the lifter box 50. Such engagement causes the lifter box to slide downwardly relative to the rails 52 and forces the body 21 of the cover 14 downwardly into the vessel 12 to its sealing position (FIG. 4). When the handle 46 is turned in a clockwise direction, the peripheral surface of the cam 45 engages a downwardly facing surface 56 at the top of the lifter box and forces the cover upwardly to its non-sealing position. Accordingly, the cover is lowered and raised between its non-sealing and sealing positions by turning the handle 46 to rotate the cam 45.

In carrying out the invention, the cover 14 uniquely coacts with the cam 45 to prevent the actuating handle 46 from being turned from its cover-closed position to its cover-open position as long as there is any substantial pressure in the vessel 12. For this purpose, the bottom of the lifting box 50 is formed with a raised rib 54 (FIG. 6) having an upwardly projecting latching abutment or shoulder 57 which is adapted to engage a circumferentially facing latching abutment or shoulder 58 formed on the periphery of the cam 45. When the two shoulders 57 and 58 are in engagement, it is not possible to turn the cam in a clockwise direction to shift the cover upwardly out of its sealing position.

When the handle 46 is swung counterclockwise toward its cover-closed position shown in FIG. 4, the peripheral surface of the cam 45 bears downwardly against the upper surface 55 of the rib 54 and forces the cover downwardly to its sealing position. As the handle reaches its full cover-closed position, the latching shoulder 58 on the cam 45 turns just slightly past the latching shoulder 57 on the rib 54. When the cam is in this position, a flat surface 60 (FIGS. 5 and 7) on the cam is spaced upwardly from and is disposed in opposing relation with the upper surface 55 of the rib 54 (see FIG. 4).

As the vessel 12 is heated, pressure builds up in the vessel. The pressure acts against the lower side of the cover 14 and forces the cover upwardly with a piston action. As the cover moves upwardly, the upper surface 55 of the rib 54 shifts into engagement with and is stopped by the flat 60 on the cam 45 and, at the same time, the latching shoulder 57 on the rib moves upwardly into opposing relationship with the latching shoulder 58 on the cam. Accordingly, the latching shoulder 58 will engage and be stopped by the shoulder 57 to prevent clockwise turning of the cam 45 if an attempt is made to turn the handle 46 clockwise to its cover-open position. In this way, the cover 14 itself serves to lock the cam 45 against opening movement.

When the pressure in the vessel 12 is relieved, the cover 14 shifts downwardly to release the shoulder 57 from the shoulder 58 and permit clockwise turning of the cam 45. To facilitate downward movement of the cover and release of the shoulders, a spring-loaded plunger 65 (FIG. 5) acts between the cover and the cam. Herein, the plunger comprises an upright stem 66 which is guided to slide upwardly and downwardly within an opening in the upper side of the cover. The upper end portion of the stem is adapted to be received within a groove 67 (FIG. 7) formed circumferentially around the periphery of the cam 45. Formed integrally with the lower end of the stem is a piston 68 (FIG. 5) which is slidably received in a cavity 69 formed in the body 21 of the cover. Two coil springs 70 are located in the cavity and are compressed between the bottom of the cavity and the lower side of the piston 68. The springs normally urge the plunger 65 upwardly to a position in which the upper end of the stem 66 projects slightly above the upper surface 55 of the rib 54 (see FIGS. 3, 4 and 6).

The upper end of the stem 66 engages the flat 60 on the cam 45 as shown in FIG. 4 after the cam has been turned to its cover-closed position and before any pressure is generated in the vessel 12. As the pressure builds up and the cover 14 shifts upwardly, engagement of the stem 66 with the vertically fixed cam 45 causes the plunger 65 to shift downwardly relative to the cover (see FIG. 5). Such downward shifting compresses the springs 70 and causes the springs to exert a downward biasing force on the cover. Accordingly, when the pressure in the vessel 12 is relieved, the springs 70 act through the plunger 65 and react against the cam 45 to force the cover downwardly. As a result, the latching shoulder 57 is positively lowered out of engagement with the shoulder 58 to permit clockwise turning of the cam to its cover-open position.

From the foregoing, it will be apparent that the cover 14 itself acts as a locking piston and moves upwardly to lock the actuating cam 45 in response to the build up of pressure in the vessel. Accordingly, there is no need to provide service or clean a separate locking device. The effective piston area of the cover and the mass of the cover are relatively large and thus small changes in pressure do not result in erratic movement of the cover. By appropriately sizing the springs 70, the cover can be made to shift downwardly only after the pressure has been reduced to a safe value. The plunger 65 effects positive downward shifting of the cover and yet does not require periodic cleaning since the piston 68 and the springs 70 are enclosed in the cavity 69 and thus are not exposed to oil and food product.

We claim:

1. A cooking device comprising an open-topped vessel adapted to hold liquid, a cover for selectively closing and sealing said vessel, means for heating the liquid to create pressure in said vessel when the latter is sealed, a support, means mounting said cover on said support for downward and upward shifting between unsealed and sealed positions, said cover being disposed in overlying but non-sealing relation with said vessel when in said unsealed position and being telescoped with and sealing said vessel when in said sealed position, an actuator mounted on said support and movable in a first direction to shift said cover downwardly from said unsealed position to said sealed position and in a second direction to shift said cover upwardly from said sealed position to said unsealed positiion, a first latching abutment located on and movable with said actuator and extending substantially vertically when said actuator has been moved to shift said cover to said sealed position, and a second latching abutment rigid with and extending substantially vertically from said cover, said second latching abutment being movable in unison with said cover and into latching relation with said first latching abutment on said actuator when said cover is in said sealed position and the pressure in said vessel causes said cover to rise, said second latching abutment being immovable relative to said cover and being operable when in latching relation with said first latching abutment on said actuator to restrict movement of said actuator in said second direction thereby to render said actuator ineffective to shift said cover upwardly from said sealed position.

2. A cooking device comprising a base, an open-topped vessel mounted on said base and adapted to hold liquid, a cover assembly for selectively closing and sealing said vessel, and means for heating the liquid to create pressure in said vessel when the latter is sealed, said cover assembly comprising a support and further comprising a cover connected to said support, means mounting said cover assembly on said base for horizontal movement between an open position in which said cover permits access to said vessel and an unsealed position in which said cover is disposed in overlying but non-telescoping and non-sealing relation with said vessel, means mounting said cover on said support for downward and upward shifting between said unsealed position and a sealed position, said cover telescoping with said vessel and closing and sealing said vessel when said over is in said sealed position, an actuator mounted on said support and movable in a first direction to shift said cover downwardly from said unsealed position to said sealed position and in a second direction to shift said cover upwardly from said sealed position to said unsealed position, a first latching shoulder located on and movable with said actuator and extending substantially vertically when said actuator has been moved to shift said cover to said sealed position, and a second latching shoulder rigid with said cover and extending substantially vertically from said cover, said second latching shoulder being movable in unison with said cover and into latching relation with said first latching shoulder on said actuator when said cover is in said sealed position and the pressure in said vessel causes said cover to rise, said second latching shoulder being immovable relative to said cover and being operable when in latching relation with said first latching shoulder on said actuator to restrict movement of said actuator in said second direction thereby to render said actuator ineffective to shift said cover upwardly from said sealed position.

3. A cooking device comprising a base, an open-topped vessel mounted on said base and adapted to hold liquid, a cover assembly for selectively closing and sealing said vessel, and means for heating the liquid to create pressure in said vessel when the latter is sealed, said cover assembly comprising a support and further comprising a cover connected to said support, means mounting said cover assembly on said base for horizontal movement between an open position in which said cover permits access to said vessel and an unsealed position in which said cover is disposed in overlying but non-telescoping and non-sealing relation with said vessel, means mounting said cover on said support for downward and upward sliding between said unsealed position and a sealed position, said cover telescoping with said vessel and closing and sealing said vessel when said cover is in said sealed position, said cover having upwardly and downwardly facing surfaces disposed in opposing relation with one another, a cam rotatably mounted on said support, said cam having a peripheral surface which, when said cam is rotated in a first direction, engages the upwardly facing surface of said cover to shift said cover downwardly from said unsealed position to said sealed position, the peripheral surface of said cam engaging the downwardly facing surface of said cover and shifting said cover upwardly from said sealed position to said unsealed position when said cam is rotated in a second direction, a first latching shoulder located on and movable with said cam, and a second latching shoulder rigid with the upwardly facing surface of said cover and movable in unison with said cover and into latching relation with said first latching sholder on said cam when said cover is in said sealed position and the pressure in said vessel causes said cover to rise, said second latching shoulder being immovable relative to said cover and being operable when in latching relation with said first latching shoulder on said cam to restrict rotation of said cam in said second direction thereby to render said cam ineffective to shift said cover upwardly from said sealed position.

4. A cooking device comprising a base, an open-topped vessel mounted on said base and adapted to hold liquid, a cover assembly for selectively closing and sealing said vessel, and means for heating the liquid to create pressure in said vessel when the latter is sealed, said cover assembly comprising a support and further comprising a cover connected to said support, means mounting said cover assembly on said base for horizontal movement between an open position in which said cover permits access to said vessel and an unsealed position in which said cover is disposed in overlying but non-telescoping and non-sealing relation with said vessel, means mounting said cover on said support for downward and upward shifting between said unsealed position and a sealed position, said cover telescoping with said vessel and closing and sealing said vessel when said cover is in said sealed position, a cam mounted for rotation on said support and rotatable in a first direction to shift said cover downwardly from said unsealed position to said sealed position and in a second direction to shift said cover upwardly from said sealed position to said unsealed position, said cam having a peripheral surface which engages said cover to shift the cover between said sealed and unsealed positions, a first shoulder on the peripheral surface of said cam, and an upwardly projecting shoulder on the upper side of said cover and movable into abutting latching relation with the shoulder on said cam when said cover is in said sealed position and the pressure in said vessel causes said cover to rise, said upwardly projecting shoulder on said cover being operable when in abutting latching relation with the shoulder on said cam to restrict rotation of said cam in said second direction thereby to render said cam ineffective to shift said cover upwardly from said sealed position.

* * * * *